United States Patent Office 3,347,911
Patented Oct. 17, 1967

3,347,911
(DIFLUOROAMINODIFLUOROMETHYL)
FLUOROCYANAMIDE $NF_2CF_2NFC\equiv N$
Douglas A. Rausch, Midland, Mich., assignor to The Dow Chemical Company, Midland, Mich., a corporation of Delaware
No Drawing. Filed Feb. 9, 1962, Ser. No. 173,610
6 Claims. (Cl. 260—551)

This invention pertains to a new compositions and a method for its preparation.

The new composition is $NF_2CF_2NFCN$. The compound is a liquid having a boiling point of about 18° C. and it is useful as a liquid oxidizer for liquid fuels such as hydrazine, pentaborane, methylhydrazine, and dimethylhydrazine. The compound may also be used as an oxidizer with metallic fuels or other solid fuels by intermixing the compound with the fuel or by gelling the oxidizer prior to intermixing with the fuel.

The new composition may be prepared by direct fluorination of an alkali metal dicyanamide in the presence of a fluoride or oxide of an alkali metal or an alkaline earth metal or an oxide of aluminum, titanium, vanadium or zirconium. Various known methods and equipment for carrying out gas-solid reactions may be used. A fluidized bed reactor is often the most convenient method. Although the weight ratio of the metal fluoride or oxide to the alkali metal dicyanamide used may be as little as 0.5:1, generally the amount is greater than that of the dicyanamide salt. The dicyanamide salt may be intermixed with the metal fluoride such that the fluoride is present in amounts greater than 20 times that of the dicyanamide salt.

While the fluorinating agent used may be used without dilution, generally a gaseous diluent is intermixed. Normally nitrogen is used due to its availability. However, any inert gas may be used as a diluent. The concentration of the fluorinating agent in the gaseous mixture is generally in the range of 1 to 30 volume percent. With a concentration below 1 volume percent of the fluorinating agent, the reaction rate is too slow for practical usage although operative. A gas mixture containing over 70 volume percent is seldom employed. Fluorine is the preferred fluorinating agent.

The fluorination is generally carried out at a temperature close to room temperature. At times it may be desirable to cool the reaction mixture so that the reaction is carried out at temperatures as low as −40° C. The (difluoroaminodifluoromethyl)fluorocyanamide formed may be stripped from the reaction mixture by the fluorinating agent and the diluent as it is passed through the reaction mixture at a reaction temperature as low as 0° C., even though the boiling point of the product is around 18° C. The product thus stripped may be condensed by passing the gases leaving the reactor through a condenser which is operated at a temperature below 0° C. Reaction temperatures above room temperature may be used; however, it is preferred to maintain the reaction temperature below 50° C. While the product obtained is storable and reasonably stable, high temperatures are preferably avoided to prevent decomposition of product.

To illustrate the preparation of the new composition, 2 grams of $NaN(CN)_2$ was intermixed with 20 grams of magnesium fluoride and placed in a 500 millimeter flask fitted with a fluorine inlet, a stirrer, and a gas outlet. The mixture while being cooled in an ice bath was rapidly stirred and treated with a gaseous mixture of fluorine and nitrogen containing 50 volume percent fluorine. The fluorine-nitrogen mixture was passed into the flask and through the mixture of sodium dicyanamide and magnesium fluoride at the rate of 200 millimeters per minute for 1 hour. The exit gases were passed through the Dry Ice-acetone cooled collection trap as they left the reaction flask. About 1 millimeter of light yellow material was collected in the trap which upon distillation yielded about 1 gram of pure $NF_2CF_2NFCN$. The pure material was colorless and had a boiling point around 18° C. The molecular weight was found to be 158. Infrared showed the presence of the NF, CF and $C\equiv N$ bonds. The structure was confirmed by nuclear magnetic resonance.

The material was safe to handle and may be used as an oxidizer for fuels such as hydrazine. When a mixture of the product and nitrogen tetroxide is used as an oxidizer for hydrazine, a theoretical specific impulse of 278 seconds is obtained.

(Difluoroaminodifluoromethyl)fluorocyanamide may likewise be prepared by fluorination of potassium dicyanamide or lithium dicyanamide instead of sodium dicyanamide as shown above. In addition the dicyanamide salt may be intermixed with an alkali metal fluoride or oxide or other alkaline earth metal fluorides or oxides instead of using the magnesium fluoride as shown above.

What is claimed is:
1. (Difluoroaminodifluoromethyl)fluorocyanamide.
2. A process for the preparation of (difluoroaminodifluoromethyl)fluorocyanamide which comprises reacting an alkali metal dicyanamide salt with a metal salt selected from the group consisting of alkali metal fluorides, alkaline earth metal fluorides, and oxides of alkaline earth metals, aluminum, titanium, vanadium, and zirconium, contacting the resulting mixture with a gaseous fluorinating agent to fluorinate the alkali metal dicyanamide, to thereby form the (difluoroaminodifluoromethyl)fluorocyanamide, and recovering the (difluoroaminodifluoromethyl)-fluorocyanamide from the reaction mixture.
3. A process for the preparation of (difluoroaminodifluoromethyl)fluorocyanamide which comprises reacting an alkali metal dicyanamide with a compound selected from the group consisting of alkali metal fluorides, alkaline earth metal fluorides, and oxides of alkaline earth metals, aluminum, titanium, vanadium, and zirconium, said compound being intermixed with the alkali metal dicyanamide in a weight ratio of from 0.5 to 20 parts of the compound per one part of the alkali metal dicyanamide, contacting at a temperature in the range of −40° to 50° C. the resulting mixture with a gaseous stream containing up to 70 volume percent of fluorine to fluorinate the alkali metal dicyanamide, to thereby form the (difluoroaminodifluoromethyl)fluorocyanamide, and recovering the (difluoroaminodifluoromethyl)fluorocyanamide from the reaction mixture.
4. A process according to claim 3 wherein alkali metal dicyanamide is sodium dicyanamide.
5. A process according to claim 4 wherein the sodium dicyanamide is reacted with magnesium fluoride.
6. A process according to claim 4 wherein the sodium dicyanamide is reacted with sodium fluoride.

No references cited.

WALTER A. MODANCE, *Primary Examiner.*

L. D. ROSDAL, *Examiner.*

J. W. WHISLER, H. MOATZ, *Assistant Examiners.*